358-86. OR 3,699,250 SR

United States Patent [15] 3,699,250
Bunting [45] *Oct. 17, 1972

[54] PROCESS AND SIGNAL DISTRIBUTING SYSTEM AND APPARATUS USED THEREIN

[72] Inventor: Earl L. Bunting, Westport, Conn.

[73] Assignee: Bunting SteriSystems, Inc., Bridgeport, Conn.

[ * ] Notice: The portion of the term of this patent subsequent to Oct. 3, 1984, has been disclaimed.

[22] Filed: Jan. 11, 1965

[21] Appl. No.: 424,502

[52] U.S. Cl..........178/6.8, 178/DIG. 1, 178/DIG. 13, 178/7.81, 307/64, 325/308, 340/310

[51] Int. Cl...........................H04n 5/655, H04n 7/10

[58] Field of Search....178/7.8, 7.81, 7.9, 6 IN, 6 PD, 178/6.8; 340/310; 179/2.5; 307/2, 18, 21, 23, 25, 26, 64, 66, 69; 5/317; 325/308

[56] References Cited

UNITED STATES PATENTS

| | | | |
|---|---|---|---|
| 637,119 | 11/1899 | Hunter | 307/69 |
| 1,400,856 | 12/1921 | Bliss | 307/66 |
| 1,468,096 | 9/1923 | Young | 307/66 |
| 2,327,386 | 8/1943 | Ashby | 307/64 |
| 2,978,538 | 4/1961 | Breese | 178/6 |
| 3,215,774 | 11/1965 | Ikegami | 178/6.8 |
| 2,222,606 | 11/1940 | Crook | 178/6 PD |
| 3,131,351 | 4/1964 | Herzfeld | 325/308 |
| 3,142,064 | 7/1964 | Hughes | 178/6 PD |
| 3,345,461 | 10/1967 | Bunting | 178/7.81 |
| 1,947,062 | 2/1934 | Rudenberg | 307/69 |
| 2,268,812 | 1/1942 | Foster | 178/6 |
| 2,716,706 | 8/1955 | Palmer | 307/66 |
| 3,072,738 | 1/1963 | Epps | 178/7.9 |

OTHER PUBLICATIONS

Television for Hospitals, Television and Short–Wave World, April 1937, pg. 205.
The Hospital of Tomorrow, This Week Magazine, The Sunday Star, Washington, D.C., R. Wacker, Jr., Jan. 17, 1960, pg. 4, 5 and 33.

*Primary Examiner*—Robert L. Griffin
*Assistant Examiner*—Joseph A. Orsino, Jr.
*Attorney*—Johnson & Kline

[57] ABSTRACT

The distribution of D.C. power and TV signals over a single wire coaxial cable to be uniformly divided and fed to a plurality of viewing stations in which a small television set is adjustably supported on a spring tensioned counterbalanced arm mounted on the bed or adjacent mounting bracket to provide for individual television viewing.

7 Claims, 9 Drawing Figures

T5005
X5175
X50L
Rn

INVENTOR
Earl L. Bunting
BY
Johnson and Kline
ATTORNEYS

INVENTOR.
Earl L. Bunting
BY
Johnson and Kline
ATTORNEYS

INVENTOR
Earl L. Bunting

BY Johnson and Kline
ATTORNEYS

INVENTOR
Earl L. Bunting
BY
Johnson and Kline
ATTORNEYS

PROCESS AND SIGNAL DISTRIBUTING SYSTEM AND APPARATUS USED THEREIN

This invention relates to a novel system for distributing operating low voltage D. C. power and signals, which may include radio frequencies, video and/or audio frequencies, to a plurality of separate stations and to the apparatus used therein and is particularly well suited for use in hospitals to provide a convenient viewing means, preferably individual, for the patient which can be readily adjusted to accommodate the posture and desires of the patient.

Heretofore, in providing television viewing facilities for patients in hospitals, due to the usual limited space in a hospital room, it has been the practice to mount the television receiver on the wall, preferably adjacent the foot of the bed and above head level, in order to avoid interference with the movement of the nurses and attendants in the normal activity in tending the patient. This has required the use of a relatively large screen, for example a 19-inch screen, to facilitate the viewing of the picture from such a distance and has required providing a strongly anchored support on the wall to sustain the weight of the television receiver. It also required the provision of power outlets and antenna leads adjacent the receiver and required additional wiring, control means and a pillow speaker to permit the patient to control the receiver and to listen to the sound. This has made the cost of each installation a substantial one. Further, with the fixed receiver so mounted it is difficult to view the picture when the patient must assume certain postures in the bed.

The present invention overcomes these difficulties by providing a novel system for distributing the power and signals throughout the hospital to an outlet in each room, preferably adjacent the head of the bed and by adjustably mounting a television set or receiver on or adjacent the bed to be plugged into said outlet and be adjustably positioned to accommodate various postures of the patient with the receiver having a simple disposable earphone or pillow speaker connected thereto for use by the patient without annoying other patients in the room. The term "television receiver" as used herein includes apparatus which may be designed to monitor a video program or receive a plurality of TV channels.

In carrying out this invention, transistorized television sets or receivers are employed and are each mounted on a counterbalanced adjustable arm secured in a socket either on the bed or adjacent the bed so that the set can be adjusted and located within easy reading distance with respect to the patient so that a set having a relatively small screen is required for good visibility.

In accordance with the invention the power and signals are applied by a novel system which includes a source of low voltage D. C. power and an antenna for receiving the signals. The signals and the power are applied to the central conductor of the coaxial cable, which cable is fed throughout the building. By suitable splitting or dividing means, the signals and power carried by the cable can be distributed and connected by suitable supplementary coaxial cables from the splitting means to individual outlets in the room into which the television receiver can be plugged. The system includes a low voltage D. C. supply having a standby battery whereby, should the power to the hospital be interrupted, the power from the battery will maintain the television sets in operation for a limited period of time. This is of great importance in a hospital since it tends to prevent anxiety among the patients should normal power to the hospital be temporarily discontinued and has a further advantage in that the usual cathode ray tube in the television set will function as a night light in such emergencies, whether or not television signals are being received.

Also, the system gives the hospital complete control over all of the receivers and should it be desired to terminate television viewing at a particular hour in the evening, this can be done very simply by turning off the power at the D.C. power supply at the source.

Another feature of the invention resides in the system whereby the splitter unit has terminals into which plugs on the ends of supplemental coaxial cables are inserted so that outlets in the various rooms fed by cables can be selectively connected to the splitter unit.

A further feature of the invention resides in the fact that the splitter unit can be provided with a terminal providing the D.C. voltage, which terminal can be connected to a television set in a nurses' station and in which a television camera can be plugged into the outlet in the room and the supplemental cable from the outlet plugged into the nurses' station so that the nurse can receive the television signals generated by the camera and have constant observation of a patient in a room from the central station.

A still further feature of the invention resides in the television receiver mounted on a counterbalanced arm and the supporting means therefor which can be releasably mounted in the usual I.V. (intravenous) apertures found in a bed or in a socket adjacent the bed to be adjusted relative thereto. Should it be required to move the bed from the room, the receiver and its support can be readily disconnected from the bed and stored in a simple wall socket until it is replaced on the bed. Further, the connection between the counterbalanced arm and support means therefor includes a pin and socket pivot preferably having an electrical connector therein.

Other features and advantages of the invention will be apparent from the specification and claims when considered in connection with the accompanying drawings in which:

The system of the present invention may be used in various institutions or locations where a plurality of viewing stations may be required. However, its presently preferred use is in hospitals and will be described herein as so employed.

Figures 1, 2, 3:
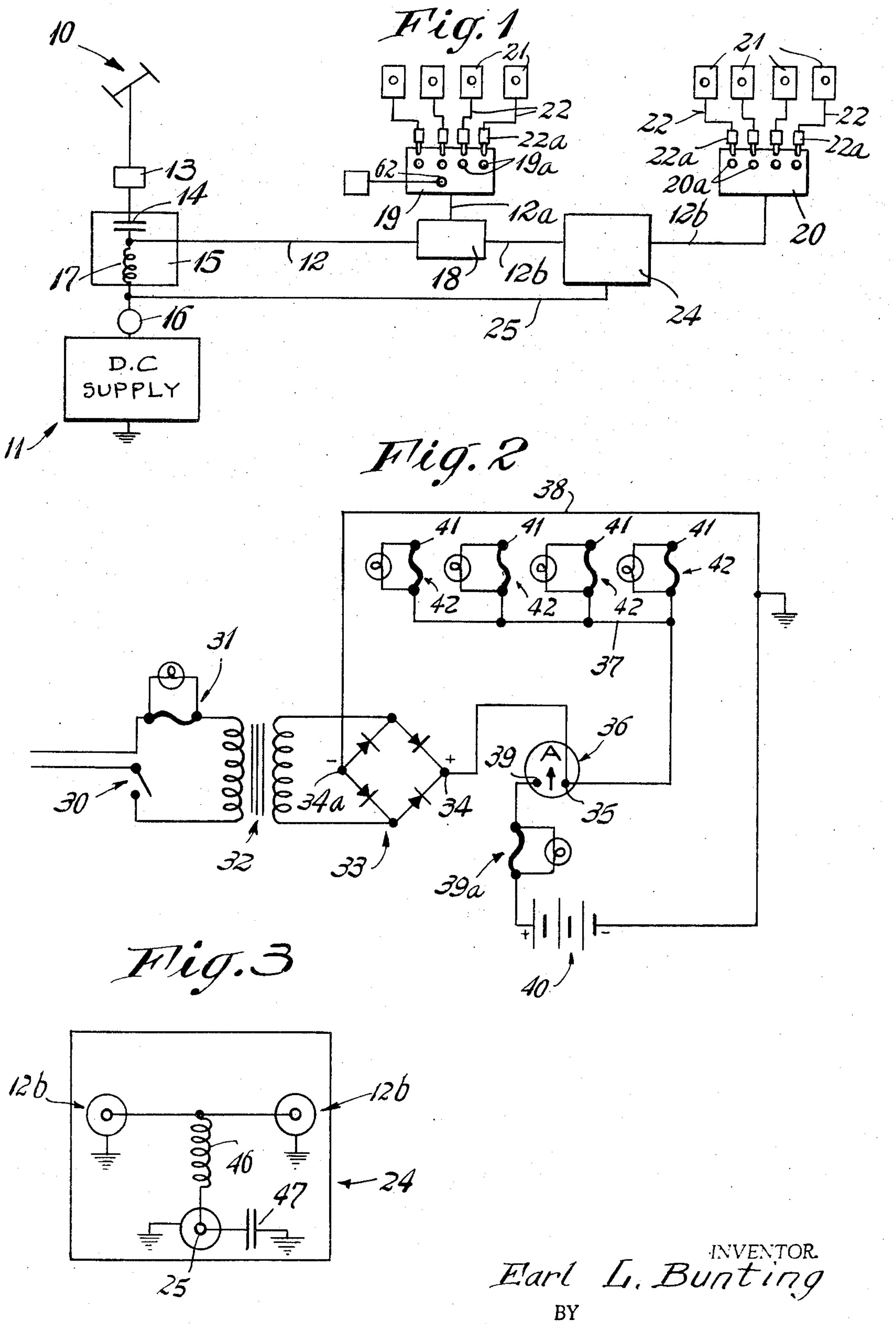
FIG. 1 is a diagrammatic view of a system distributing power and radio frequency or video signals.
FIG. 2 is a diagrammatic view of the D.C. power source.
FIG. 3 is a diagrammatic view of a D.C. injector unit.

The system is illustrated diagrammatically in FIG. 1 and comprises a signal source or antenna 10 and a low voltage D.C. source 11 which are connected to the center conductor of a coaxial distribution cable 12. All coaxial cables used herein have the usual grounded shield or sheath. Preferably, the antenna is connected through a suitable amplifier 13 and a capacitor 14 located in a junction unit 15 while the D.C. power source is connected through a controller 16 and a choke 17 in the junction unit. The controller 16 can be any suitable switching device which will enable the hospital personnel to turn on and off the power to each distribution cable as required, for example at a 10 P.M. curfew.

Figures 6, 7:
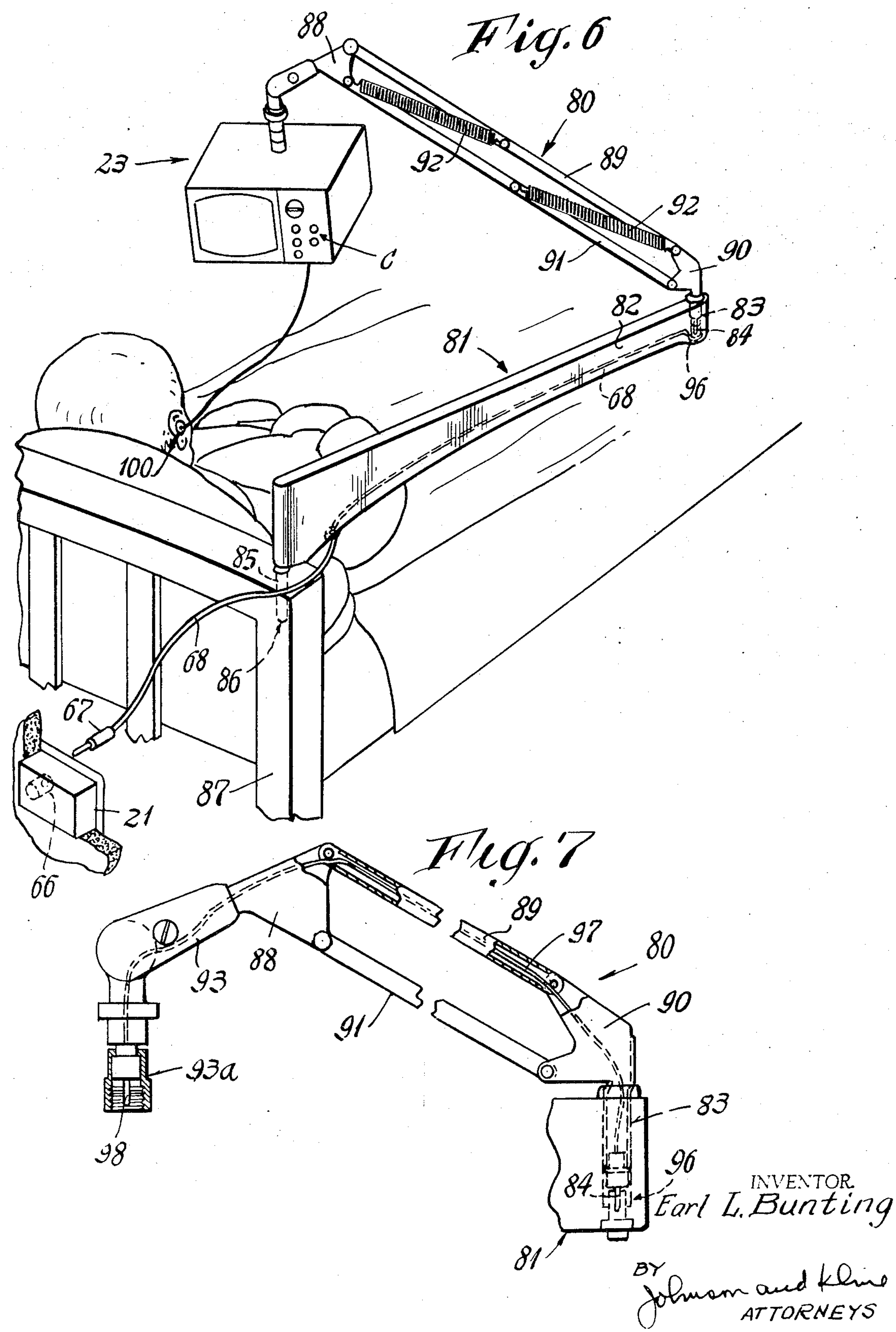
FIG. 6 is a view of the television receiver and support therefor mounted on a bed.
FIG. 7 is a view partly in section of the counterbalanced arm

The distribution cable carries the power and signals to the section of the hospital to be served where it is distributed to the various room outlets. In the illustrated form of the invention the distribution cable 12 feeds into a divider or splitting unit 18 which divides the signal and power and impresses said power and signal on secondary distributing coaxial cables 12*a*, 12*b* which feed, for example, individual sections in the hospital. The secondary cables terminate in a divider or splitting unit in each section and forms the distributing point for the section whereby the signals and power are distributed to individual outlets in the rooms in said section. As shown in FIG. 1, the secondary cable 12*a* feeds to the splitter unit 19 and secondary cable 12*b* feeds to the splitter unit 20, each of which distributes the signal and power to a plurality of outlets 21 located in the rooms by supplemental coaxial cables 22 preferably having plugs 22*a* which plug into terminals 19*a* or 20*a* on the splitter unit. The outlets can have a television receiver 23, as shown in FIG. 6, connected thereto to provide a patient with a personal television program as will be described.

In some instances, due to the length of the cable or other load factors, an undesired voltage drop may occur and to counteract this, a D.C. voltage injector 24 can be connected, for example, in the distribution cables. As shown in FIG. 1, the voltage injector 24 is connected to cable 12*b* and, directly by cable 25, to the D.C. power source to supply supplemental power thereto to replace the power loss.

A preferred form of low voltage D.C. supply 11 is shown in FIG. 2. An alternating current power source A.C. is connected through a switch 30 and a fuse unit 31 having a fuse and lamp to transformer 32. The output of the transformer is fed through a rectifier bridge 33. The positive terminal 34 of the bridge is connected to one terminal 35 of an ammeter 36 and also to a bus bar 37 to provide plus voltage. The negative terminal 34*a* of the bridge is fed to a minus bus bar 38 which is grounded. The other terminal 39 of the meter is fed through a fuse unit 39*a* to the plus terminal of a battery 40. The negative terminal of the battery is connected to the negative bus bar or ground. Thus, when the system is in operation, the normal flow of energy is through the transformer and through the bridge directly to the plus bus bar.

Should the power supply from the A.C. source be cut off, the system would automatically be supplied power from the battery which would take care of the load and provide the required voltage. The meter 36 is so wired as to indicate when the batteries are being used. Also, the current demand on the circuit can be read on the meter at any time by turning off the A.C. power supply.

As shown, a plurality of plus terminals 41 are provided on the power supply which are connected through fuse units 42 to the plus bus bar 37. These terminals can be connected to the cables 12 to supply the D.C. current into any of the areas in which the set is located and to any direct current injectors that may be required in the system.

The voltage injector unit 24 as at present preferred is shown diagrammatically in FIG. 3 wherein the center conductor of the secondary cable 12b is connected through a choke coil 46 to the center conductor of the cable 25 from the power source, said conductor being connected to ground through capacitor 47 to improve the Q of the choke coil. This unit will supply additional power to the system to compensate for voltage drops therein and insure full operating voltage at the receivers.

Figure 4:
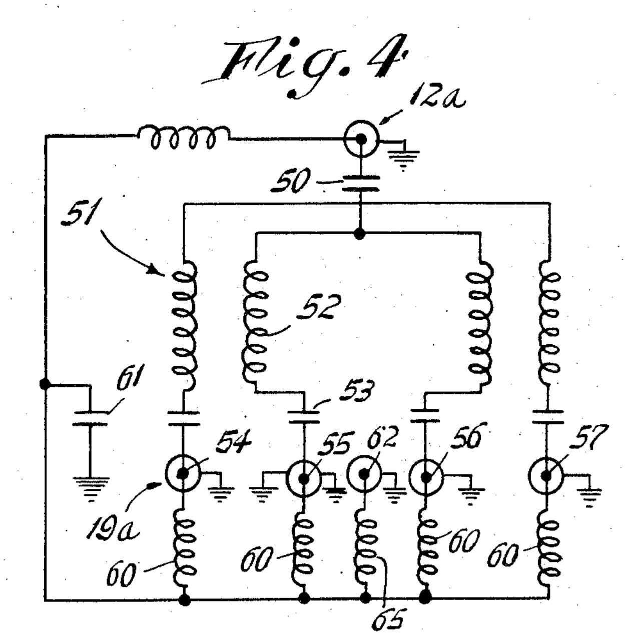
FIG. 4 is a diagrammatic view of a splitter unit of the present invention.

The dividers or splitter units 18, 19, 20 are basically the same, but differ only as to the number of divisions as may be required; however, the unit 19 which has all of the features which are at present employed in the system will be described. The unit 19 is shown diagrammatically in FIG. 4 in which the signal coming in on the center conductor of the coaxial cable 12a passes through a capacitor 50 to a network 51 of splitter coils or inductance 52 and capacitors 53, which network divides the signal into the required number of parts and impresses it on the central terminals 54, 55, 56, 57 of the four coaxial output fittings 19*a* into which the plugs 22*a* of the supplemental cable 22 are inserted. The center conductor of the cable 12*a* is also connected to the said terminals on the output fittings without passing through the network 51 to apply D.C. voltage to said terminals. Preferably, this connection includes a network of radio frequency chokes 60 and capacitors 61 to prevent any D.C. saturation of the splitter coils of the signal network. The splitter unit, therefore, provides each coaxial output fitting 19*a* with the required power and signals to be supplied to outlet boxes 21 in the rooms by the supplemental coaxial cables 22.

The splitter has a socket or fitting 62 which is connected to an outlet 63 in a nurses' station by a coaxial cable 64 (FIG. 9) which socket has the center conductor thereof connected to the power supply circuit in the splitter unit by a choke 65.

Figure 5:
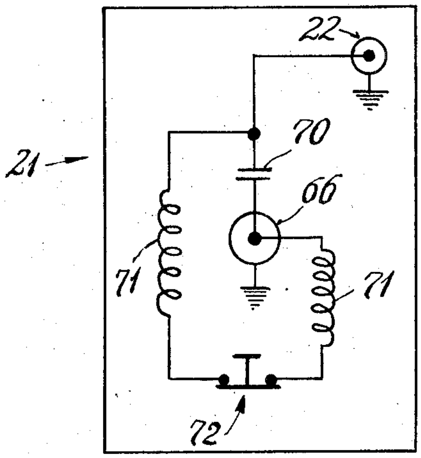
FIG. 5 is a diagrammatic view of an outlet in a room.

The outlet 21 which is diagrammatically shown in FIG. 5 is located in the hospital room on the wall adjacent the head of the patient's bed and is provided with a quick disconnect coaxial fitting means including a socket 66 for receiving a plug 67 on a coaxial cable 68 connecting the television receiver mounted on the bed as shown in FIG. 6.

As shown in FIG. 5 the supplemental cable 22 coming into the outlet has its central conductor connected through capacitor 70 to the center contact of the socket 66 to supply signals thereto and through the chokes 71 to supply the D.C. power. If desired, a normally closed circuit breaker 72 can be provided to prevent overload of the system.

As shown in FIG. 6, the television receiver 23 is mounted on a counterbalanced arm 80 pivotally connected to a support 81 herein illustrated as a supporting arm 82 having a socket 83 at one end to receive a pin 84 on the end of the counterbalanced arm 80 and having a post or pin 85 on the other end to be received in a suitable supporting socket adjacent the bed. While this may be a post or pin-receiving socket on the wall, it is shown in the drawings as mounted in the usual convenient I.V. socket 86 formed in the frame 87 of the bed.

While the counterbalanced arm may take many forms, it is at present preferred to use an arm comprising a parallelogram linkage 88, 89, 90, 91 having counterbalancing springs 92 thereon as shown. The end link 90 carries the pin 84 and the end link 88 carries a fitting 93 having a swivel 93*a* which is secured to the top of the television receiver to support it in various adjusted positions thereon.

In order to supply the power and signals to the television receiver, the supporting arm 82 carries a coaxial cable 68 having one end provided with the plug 67 to be inserted into the socket 66 of the outlet 21 in the room. The other end of the cable is connected to a releasable coaxial pin and socket connector 96 having one part in the socket 83 and the other part carried by the pin 84 to which a coaxial cable 97 is connected and extends to the other end of the arm 80 and, as shown in FIG. 7, is connected to the terminal pin 98 carried by the swivel 93*a* of the fitting 93 and forming the electrical connection to the television receiver whereby the power and signals are supplied thereto.

While the receiver has the usual speaker therein, it is at present preferred to use a disposable earphone or pillow speaker 100 as shown in FIG. 6 connected to the receiver so that the patient can enjoy the sound produced by the audio signals without interfering with or distracting other patients.

It will be seen that the foregoing construction is very advantageous in a hospital room since the operating power and signals emanate from a single outlet plug adjacent the head of a bed and the receiver is adjustably carried by the counterbalanced arm and the supporting arm so that it can be adjusted to any desired position of the posture of the patient. Since it can be moved in close to the patient the usual controls C. on the television receiver can be manipulated by the patient to tune in the programs he desires.

If it is desired to remove the bed from the room for any reason, the supporting arm can be readily removed therefrom by lifting it and the receiver supported thereby from the I.V. socket on the bed and it can be supported on a wall bracket or the like (not shown).

If it is desired to remove the television set from the supporting arm this can be readily done by lifting the arm 80 and its pin 84 out of the socket 83 on the end of the arm which automatically breaks the electrical connection thereto at 96. When the arm 80 and set are replaced, the electrical connection will be automatically re-connected.

Since the set can be adjusted to a comfortable reading distance for the patient, a relatively small screen can be employed and while the television receiver as herein illustrated is a complete unit, it is to be understood that in the broader aspects the receiver could comprise the cathode ray tube and its harness with the speaker and it can have its tuning circuits mounted on the supporting arm.

In accordance with the present invention a usual transistorized television receiver 23 is used and in order to better function with the system, the receiver has been modified by removing the power and filter circuits usually found therein since the receiver is supplied directly by the low voltage D.C. power and the signal coming in through the coaxial cable. This not only reduces the weight of the receiver which permits it to be more readily carried by the spring-balanced arm 80, but also provides a unique system of supplying energy and signal thereto through a single pin connection.

Figure 8:
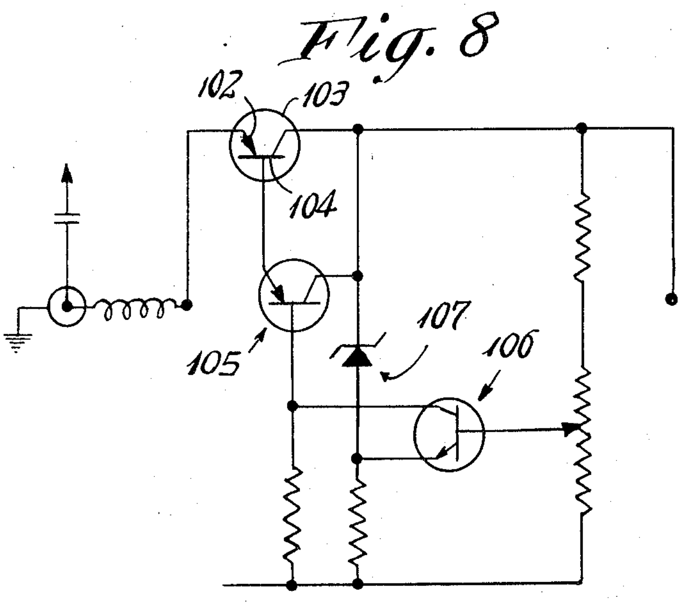
FIG. 8 is a diagrammatic view of a voltage regulator for the television receiver.

In addition to the above-noted modification of the receiver, there is also provided therein a novel regulating circuit such as shown in FIG. 8 for maintaining the voltage on the receiver at a constant level even though many receivers may be applied to the system. The voltage regulator system accomplishes three major functions in that it provides constant voltage, filtered D.C. power and protection from improper polarity of the voltage source.

The signals coming in on the cable 68 are fed to the tuning circuit (not shown) of the receiver and input voltage from the cable has the plus terminal fed to the emitter terminal 102 of the power transistor 103. The base 104 is controlled by two amplified transistors 105, 106 and one Zener circuit 107 to maintain constant output voltage of 12 volts forming the power source for the receiver.

Figure 9:
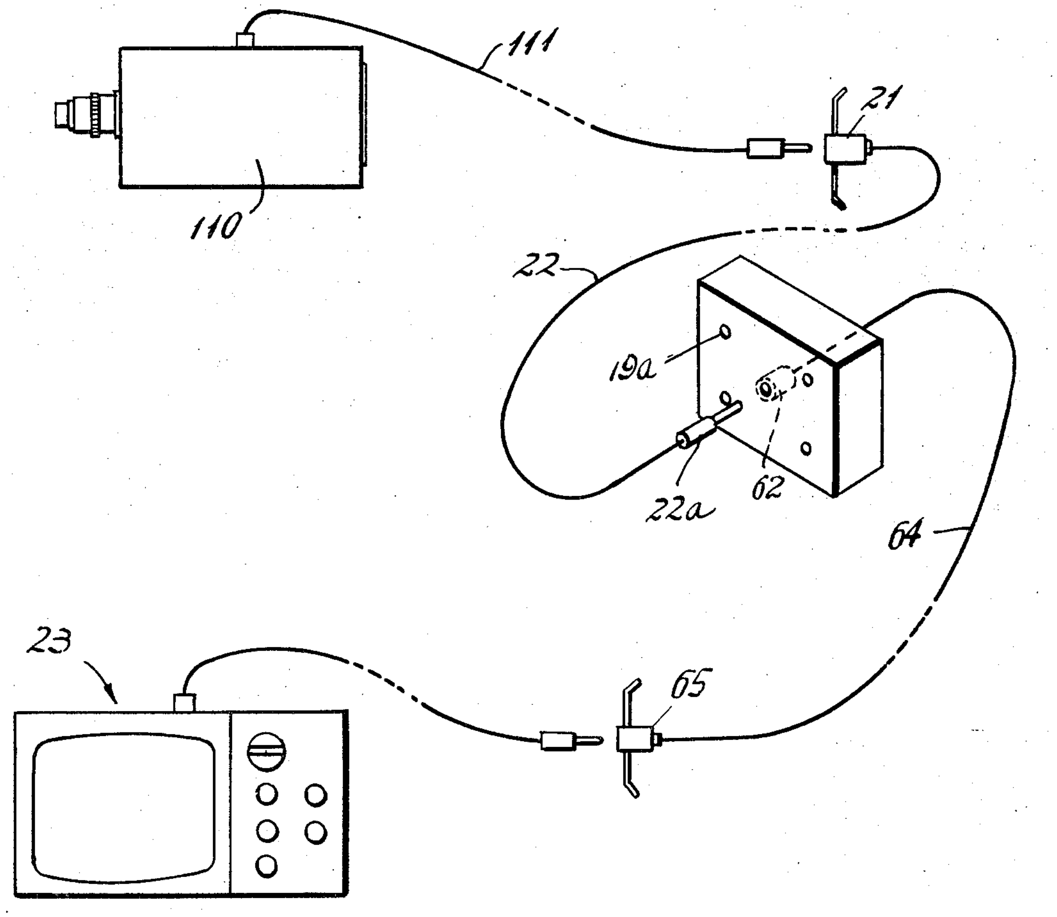
FIG. 9 is a diagrammatic view of a portion of the system as used for patient observation.

Under some circumstances it may be desired to have a patient under constant observation by a nurse. This can be readily accomplished by a simple change in the present system by removing the television receiver 23 and substituting therefor a television camera 110 as shown in FIG. 9. The cable 111 from the camera is plugged into the socket 21. The supplementary cable 22 extending from the socket has its plug 22*a* removed from the output terminal 19*a* in the splitter unit and inserted in the nurses' terminal 62 in the splitter unit which is connected by cable 64 to an outlet 65 in the nurses' station into which a television receiver 23 is plugged so that signals generated in the camera can be constantly viewed by the nurse at her station.

Variations and modifications may be made within the scope of the claims and portions of the improvements may be used without others.

I claim:

1. A system for hospitals or the like for simultaneously delivering power and television signals to a plurality of hospital rooms having at least one bed therein comprising a source of D.C. power; an antenna for receiving television signals; means combining the television signals and the D.C. power and impressing the same on the central conductor of a coaxial distribution cable; means dividing the combined power and television signals uniformly and feeding them to an outlet adjacent a bed in each of said rooms; a television receiver adjustably mounted on each bed, the adjustable mounting for the receiver comprising a support means mounted adjacent said bed, a counterbalanced arm having one end pivotally mounted on the support means and having a swivel connection at the other end secured to said television receiver whereby said television receiver can be adjusted to a plurality of positions to accommodate various postures of the patient in the bed; and means carried by the first arm and counterbalanced arm to connect the television receiver to said outlet to supply the receiver with power and television signals therefrom.

2. A system for hospitals or the like for simultaneously delivering power and television signals to a plurality of hospital rooms having at least one bed therein comprising a source of D.C. power; an antenna for receiving television signals; means combining the television signals and the D.C. power and impressing the same on the central conductor of a coaxial distribution cable; means dividing the combined power and television signals uniformly and feeding them to an outlet adjacent a bed in each of said rooms; a television receiver adjustably mounted on each bed, the adjustable mounting for the receiver comprising a first arm having one end pivotally mounted on said bed, a counterbalanced arm having one end pivotally mounted on the other end of said first arm and having a swivel connection at the other end secured to said television receiver whereby said television receiver can be adjusted to a plurality of positions to accommodate various postures of the patient in the bed; and means carried by the first arm and counterbalanced arm to connect the television receiver to said outlet to supply the receiver with power and television signals therefrom.

3. A television viewing station having a transistorized television receiver and means for adjustably mounting the receiver at said station comprising a counterbalanced arm having one end pivotally mounted to a support and having a swivel connection at the other end secured to said television receiver whereby said television receiver can be adjusted through the action of the counterbalanced arm and swivel connection to a plurality of positions; and coaxial cable means carried by the counterbalanced arm and connecting the television receiver to an outlet having D.C. power and television signals impressed thereon to supply the receiver with D.C. power and television signals.

4. A transistorized television receiver and means for adjustably mounting the receiver on a bed comprising a first arm having one end pivotally mounted on the bed for movement in a horizontal plane and a vertically adjustable counterbalanced arm having one end pivotally mounted to the other end of the first arm and having a swivel connection at the other end secured to said television receiver whereby said television receiver can be adjusted through the action of the first arm, counterbalanced arm and swivel connection to a plurality of positions to accommodate various postures of a patient in the bed; and coaxial cable means carried by said arms and connecting the television receiver to an outlet to supply the receiver with D.C. power and television signals.

5. A transistorized television receiver and means for adjustably mounting the receiver on a bed comprising a counterbalanced arm including linkage means and counterbalancing springs thereon, said arm having one end pivotally mounted to a support and having a swivel connection at the other end secured to said television receiver whereby said television receiver can be adjusted through the action of the counterbalanced arm and swivel connection to a plurality of positions to accommodate various postures of a patient in the bed; and coaxial cable means carried by the counterbalanced arm and connecting the television receiver to an outlet to supply the receiver with D.C. power and television signals.

6. A transistorized television receiver and means for adjustably mounting the receiver on a bed comprising a support including a first arm having one end pivotally mounted on the bed for movement in a horizontal plane and a vertically adjustable counterbalanced arm having one end mounted by pivot means to the other end of the first arm and having a swivel connection at the other end secured to said television receiver whereby said television receiver can be adjusted through the action of the first arm, counterbalanced arm and swivel connection to a plurality of positions to accommodate various postures of a person in the bed, said pivot means including a releasable plug and socket electrical connection; and a coaxial cable carried by each of said arms and having one end connected to said plug and socket connection with the other ends connected to the swivel connection and an outlet respectively and connecting the television receiver to said outlet to supply the receiver with D.C. power and television signals.

7. A system for use in hospitals or the like for simultaneously delivering power and television signals to a plurality of hospital rooms each having at least one bed therein comprising a source of D.C. power; an antenna for receiving television signals; means combining the television signals and the D.C. power and impressing the same on the central conductor of a coaxial distribution cable; a splitter unit connected to said coaxial cable and having means dividing the combined power and television signals uniformly and impressing them on output terminals thereon; a supplemental coaxial cable having one end connected to an outlet adjacent a bed in said room and having the other end connectible to one of said output terminals of the splitter unit; a television set adjustably mounted on each bed; means directly connecting said outlet in each room to said television set to be supplied with operating power and television signals therefrom, said splitter unit having a nurses' terminal having the D.C. voltage thereon and connected by a supplemental coaxial cable to a television viewer at a nurses' station, and a television camera disposed in the room adjacent the bed and connected to said outlet in said room, said outlet in said room being connected by said first-mentioned supplemental coaxial cable to said nurses' terminal to receive power therefrom, said camera generating television signals which are transmitted over said supplemental coaxial cables to said television viewer at the nurses' station whereby remote patient observation by the nurse can be performed.

* * * * *